US008903909B1

(12) United States Patent
Marra et al.

(10) Patent No.: US 8,903,909 B1
(45) Date of Patent: Dec. 2, 2014

(54) DETECTING AND EXTENDING ENGAGEMENT WITH STREAM CONTENT

(75) Inventors: Gregory Matthew Marra, San Francisco, CA (US); Jonathan Terleski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/234,008

(22) Filed: Sep. 15, 2011

(51) Int. Cl.
*G06F 15/16* (2006.01)

(52) U.S. Cl.
USPC ............................ 709/204; 709/200; 709/231

(58) Field of Classification Search
CPC ........................... G06Q 50/01; G06Q 30/0241
USPC .......................................... 709/200, 204, 224
See application file for complete search history.

(56) References Cited

U.S. PATENT DOCUMENTS

| | | | | |
|---|---|---|---|---|
| 6,130,938 | A | 10/2000 | Erb | |
| 6,192,119 | B1 | 2/2001 | Wilson | |
| 6,697,478 | B1 | 2/2004 | Meldrum et al. | |
| 6,754,322 | B1 | 6/2004 | Bushnell | |
| 7,020,685 | B1 * | 3/2006 | Chen et al. | 709/204 |
| 7,106,848 | B1 | 9/2006 | Barlow et al. | |
| 7,366,990 | B2 | 4/2008 | Pitroda | |
| 7,555,110 | B2 | 6/2009 | Dolan et al. | |
| 7,610,287 | B1 | 10/2009 | Dean et al. | |
| 7,680,098 | B2 * | 3/2010 | John et al. | 370/352 |
| 7,742,468 | B2 | 6/2010 | Vagelos | |
| 8,060,634 | B1 * | 11/2011 | Darnell et al. | 709/231 |
| 8,473,437 | B2 * | 6/2013 | Zaman et al. | 706/21 |
| 8,544,048 | B2 * | 9/2013 | Wiser et al. | 725/97 |
| 8,594,283 | B2 * | 11/2013 | Hogan et al. | 379/88.12 |
| 8,655,321 | B2 * | 2/2014 | Baer et al. | 455/412.2 |
| 2002/0137490 | A1 | 9/2002 | Gallant | |
| 2002/0143874 | A1 | 10/2002 | Marquette et al. | |
| 2004/0258220 | A1 | 12/2004 | Levine et al. | |
| 2005/0020316 | A1 * | 1/2005 | Mahini | 455/566 |
| 2005/0152521 | A1 | 7/2005 | Liljestrand | |
| 2006/0026288 | A1 | 2/2006 | Acharya et al. | |
| 2006/0077957 | A1 | 4/2006 | Reddy et al. | |

(Continued)

FOREIGN PATENT DOCUMENTS

| | | | | |
|---|---|---|---|---|
| WO | WO02079984 | | 10/2002 | |
| WO | WO 2009023067 | A1 * | 2/2009 | G06Q 10/00 |

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Anthony Mejia
(74) *Attorney, Agent, or Firm* — Patent Law Works LLP

(57) ABSTRACT

A system for detecting and extending user engagement with stream content includes an engagement extension module that comprises a context identification module, an abandonment detection module, an engaging post generator and an injection module. The context identification module determines the interactions of the user with content stream and provides the user interaction signals to the abandonment detection module. The abandonment detection module analyzes these signals to determine whether there is a risk that the user may abandon or disengage from interacting with the content stream. The engaging post generator generates messages or other information likely to be interesting to the user and keep them engaged. If the abandonment detection module determines that there is a risk that the user may abandon or disengage from interacting with the content stream, the injection module adds a message or post generated by the engaging post generator into the content stream for the user.

35 Claims, 10 Drawing Sheets

(56) References Cited

U.S. PATENT DOCUMENTS

| | | | | |
|---|---|---|---|---|
| 2006/0206604 | A1 | 9/2006 | O'Neil et al. | |
| 2007/0127631 | A1 | 6/2007 | Difiglia | |
| 2007/0171898 | A1 | 7/2007 | Salva | |
| 2007/0173236 | A1 | 7/2007 | Vishwanathan et al. | |
| 2007/0204223 | A1* | 8/2007 | Bartels et al. | 715/540 |
| 2007/0223699 | A1* | 9/2007 | Jones et al. | 380/262 |
| 2007/0248077 | A1 | 10/2007 | Mahle, Jr. et al. | |
| 2008/0056475 | A1 | 3/2008 | Brannick et al. | |
| 2008/0192656 | A1 | 8/2008 | Vagelos | |
| 2008/0249867 | A1* | 10/2008 | Angell et al. | 705/14 |
| 2009/0112837 | A1* | 4/2009 | Modani et al. | 707/5 |
| 2009/0119254 | A1* | 5/2009 | Cross et al. | 707/3 |
| 2009/0119278 | A1* | 5/2009 | Cross et al. | 707/5 |
| 2009/0234968 | A1* | 9/2009 | Thomas et al. | 709/241 |
| 2009/0265750 | A1* | 10/2009 | Jones et al. | 725/116 |
| 2010/0083308 | A1* | 4/2010 | Chang et al. | 725/37 |
| 2010/0131455 | A1* | 5/2010 | Logan et al. | 707/602 |
| 2010/0250558 | A1* | 9/2010 | Wang | 707/749 |
| 2010/0287026 | A1* | 11/2010 | Smith | 705/10 |
| 2010/0325666 | A1* | 12/2010 | Wiser et al. | 725/44 |
| 2011/0098156 | A1 | 4/2011 | Ng et al. | |
| 2011/0099076 | A1* | 4/2011 | Repas | 705/14.69 |
| 2011/0183724 | A1* | 7/2011 | Medved et al. | 455/567 |
| 2011/0218845 | A1* | 9/2011 | Medina | 705/14.11 |
| 2011/0320423 | A1* | 12/2011 | Gemmell et al. | 707/706 |
| 2011/0320441 | A1* | 12/2011 | Lee et al. | 707/723 |
| 2012/0011227 | A1* | 1/2012 | Jones et al. | 709/219 |
| 2012/0042012 | A1* | 2/2012 | Darnell et al. | 709/203 |
| 2012/0066073 | A1* | 3/2012 | Dilip et al. | 705/14.66 |
| 2012/0078822 | A1* | 3/2012 | Sathish et al. | 706/12 |
| 2012/0102191 | A1* | 4/2012 | Rabii | 709/224 |
| 2012/0166452 | A1* | 6/2012 | Tseng | 707/749 |
| 2012/0278331 | A1* | 11/2012 | Campbell et al. | 707/740 |
| 2012/0304072 | A1* | 11/2012 | Mercuri et al. | 715/745 |
| 2012/0311083 | A1* | 12/2012 | Julia et al. | 709/217 |
| 2013/0006754 | A1* | 1/2013 | Horvitz et al. | 705/14.43 |
| 2013/0014145 | A1* | 1/2013 | Bhatia et al. | 725/13 |
| 2013/0124499 | A1* | 5/2013 | Liau | 707/709 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, pp. 252-255, London, United Kingdom.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Murchu et al., "Online Social and Business Networking Communities," Digital Enterprise Research Institute DERI Technical Report, National University of Ireland, Aug. 11, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
Singh et al., "Cinema: Columbia InterNet Extensible Multimedia Architecture," Department of Computer Science, Columbia University, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

DETECTING AND EXTENDING ENGAGEMENT WITH STREAM CONTENT

BACKGROUND

The present disclosure relates to social networks and the presentation of content. In particular, the present disclosure relates to systems and methods for detecting and extending user engagement with stream content. Still more particularly, the present disclosure relates to a system for determining user interaction with a social network and adding new posts or messages to extend user engagement.

The popularity and use of the Internet, web browsers, social networks and other types of electronic communication has grown dramatically in recent years. In particular, social networks have become a very popular and a preferred method for interaction with others. While social networks were once limited to posting messages, photos or videos, about oneself, the functionality provided by social networks has increased greatly. For examples, user can not be presented with a stream of content that includes messages, photos or videos but can also include other content such as news, micro blog posts, and presence information.

However, for some users the amount of content provided to them is limited because of their use of the social network, their social graph or other factors. Many such users are not using the social network to its full functionality because of a lack of knowledge, a failure to provide interests or data, or various other factors. When the stream content becomes limited, users often leave the social network or use it less frequently or not all.

SUMMARY

In one innovative aspect, a system for detecting and extending user engagement with stream content includes an engagement extension module. The engagement extension module comprises a context identification module, an abandonment detection module, an engaging post generator and an injection module. The context identification module determines the interactions of the user with content stream and determines the user's context. The context identification module provides the user interaction signals to the abandonment detection module. The abandonment detection module analyzes these signals to determine whether there is a risk that the user may abandon or disengage from interacting with the content stream. The engaging post generator generates messages or other information likely to be of interest to the user and keep them engaged. If the abandonment detection module determines that there is a risk that the user may abandon or disengage from interacting with the content stream, the injection module adds a message or post generated by the engaging post generator into the content stream for the user.

The present disclosure also includes a method for detecting and extending user engagement with stream content comprising the steps of: determining the context of user interaction with the content stream, determining a likelihood of abandonment or disengagement from the content stream, creating engaging content and adding it to the stream if there is a risk of the user disengaging with the content stream.

The present disclosure is particularly advantageous in a number of respects. First, the engagement extension module provides additional content to the user and ensures they are more engaged with the social network. Second, the engagement extension module can be used to provide information to educate the user about new functionality or other system information. Third, the engagement extension module can make the user experience more enjoyable, thereby extending the time duration of each engagement as well as increasing the likelihood that the user will engage with the social network the future.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
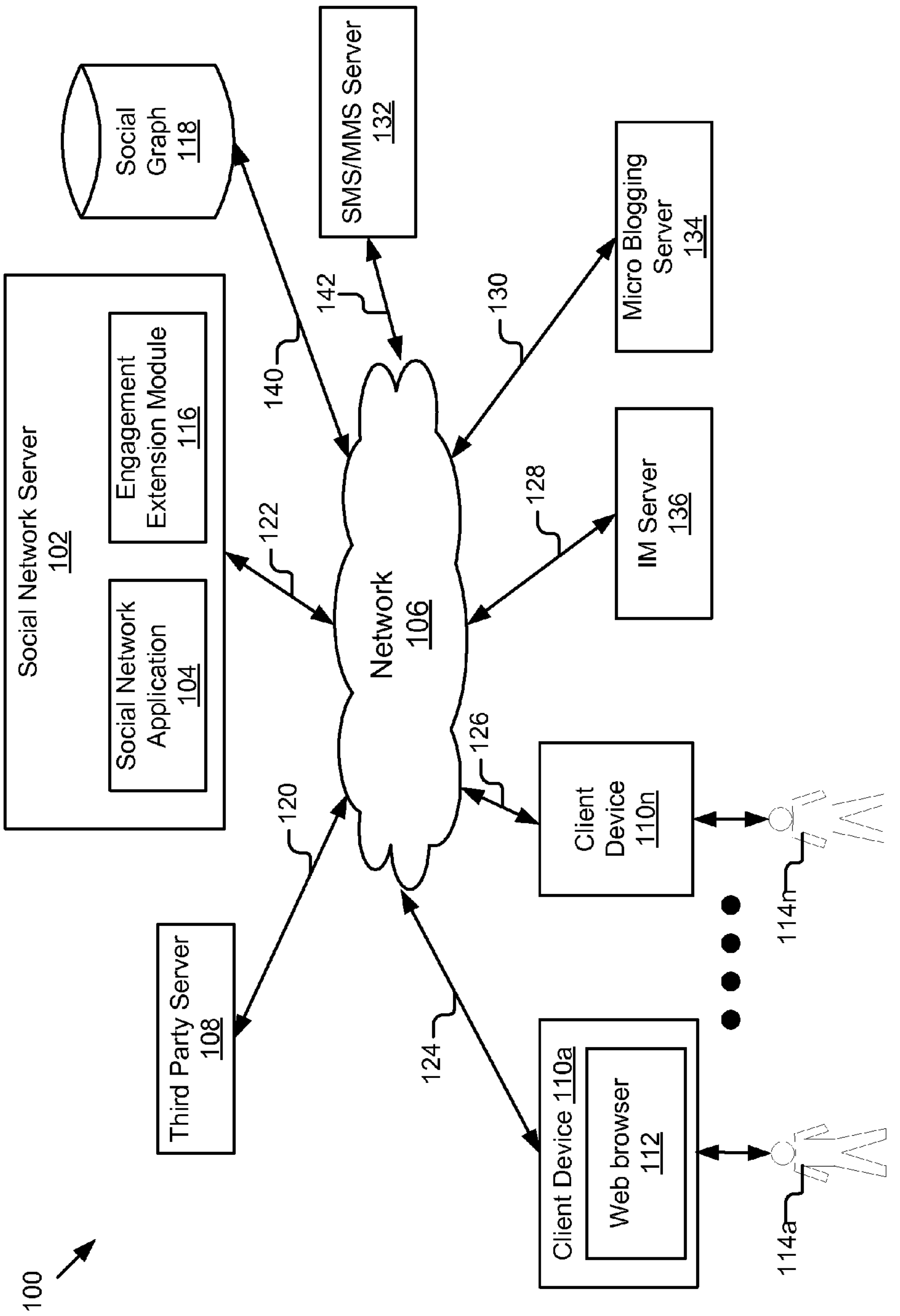
FIG. 1 is a block diagram illustrating an embodiment of a system for detecting and extending user engagement with stream content.

FIG. 1 illustrates a block diagram of one embodiment of a system 100 for detecting and extending user engagement with stream content. The illustrated system 100 for detecting and extending user engagement with stream content includes a social network server 102 having a social network application 104 and an engagement extension module 116, a network 106, a third party server 108, one or more client devices 110*a*-110*n* that are accessed by users 114*a*-114*n*, a social graph 118, an SMS/MMS sever 132, a micro blogging server 134 and a IM server 136. In the illustrated embodiment, these entities are communicatively coupled via a network 106. Although only two client devices 110 are illustrated, persons of ordinary skill in the art will recognize that any numbers of client devices 110*n* are available to any number of users 114*n*. Moreover, while the present disclosure is described below primarily in the context of detecting and extending user engagement with stream content, the present disclosure is applicable to extending user engagement with other systems and data.

The client devices 110*a*, 110*n* in FIG. 1 are used by way of example. While FIG. 1 illustrates two devices, the present disclosure applies to any system architecture having one or more client devices 110. Furthermore, while only one network 106 is coupled to the social network server 102, the third party server 108, the client devices 110*a*,110*n*, the social graph 118, the SMS/MMS sever 132, the micro blogging server 134 and the IM server 136, in practice any number of networks 106 can be connected to the entities. Furthermore, while only one third party server 108 is shown, the system 100 could include one or more third party servers 108.

While shown as stand-alone server in FIG. 1, in other embodiments all or part of the social network server 102 could be part of the third party server 108 that is connected to the network 106. The social network server 102 interacts via signal line 122 and the network 106 with the third party server 108, client devices 110*a*-110*n*, the social graph 118, the SMS/MMS sever 132, the micro blogging server 134 and the IM server 136. The social network server 102 includes the social network application 104 and the engagement extension module 116. The operation functionality of engagement extension module 116 is described in more detail below with reference to FIGS. 3-9. The social network server 102 cooperates with the client device 110 to generate and present user interfaces that extend engagement with the user. The social network server 102 also collects data from these other system and components to determine information about a user's context and state. The social network server 102 is also coupled for communication with the client device 110*a*, which is connected to the network 106 via signal line 124. The user 114*a* interacts with the client device 110*a* as represented by the signal line. Similarly, the client device 110*n* is coupled to the network 106 via signal line 126 and the user 114*b* interacts with the client device 110*n* as represented by a signal line. It should be understood that the social network server 102 can be stored in any combination of the devices and servers, or in only one of the devices or servers. The social graph 118, the SMS/MMS sever 132, the micro blogging server 134 and the IM server 136 are coupled to the network 106 by signal lines 140, 142, 128 and 130, respectively for communication with the social network server 102. In some embodiments, the social network server 102 receives web search history and information from the search server (not shown) and other signals from an email server (not shown) that can be used in addition to the present disclosure to determine when a user is about to abandon or disengage from a content stream.

In one embodiment, the social network server 102, the third party server 108, the micro-blogging server 134, the SMS/MMS server 132, and the IM server 136 are hardware servers including a processor, memory, and network communication capabilities.

The social network server 102 as noted above includes a social network application or software 104. Although only one social network server 102 is shown, it should be understood that multiple servers may be present. A social network is any type of social structure where the users are connected by a common feature. The common feature includes friendship, family, work, an interest, etc. The common features are provided by one or more social networking systems, such as those included in the system 100, including explicitly-defined relationships and relationships implied by social connections with other online users, where the relationships form a social graph 118. In some examples, the social graph 118 can reflect a mapping of these users and how they are related. Furthermore, it should be understood that social network server 102 and social network application 104 are representative of one social network and that there are multiple social networks coupled to the network 106, each having its own server, application and social graph. For example, a first social network is more directed to business networking, a second more directed to or centered on academics, a third is more directed to local business, a fourth directed to dating and others of general interest or a specific focus. In another embodiment (not shown), the engagement extension module 116 is stored on a third party server 108, which is connected to the network 106 via signal line 120. In yet another embodiment, the engagement extension module 116 is stored on a user device 110*a*, 110*n*, which is connected to the network 106 via signal line 124, 126. It should be understood that the engagement extension module 116 can be stored in any combination on the devices and servers.

The network 106 is a conventional type, wired or wireless, and may have any number of configurations such as a star configuration, token ring configuration or other configurations. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

Social Network Server 102

Figure 2:
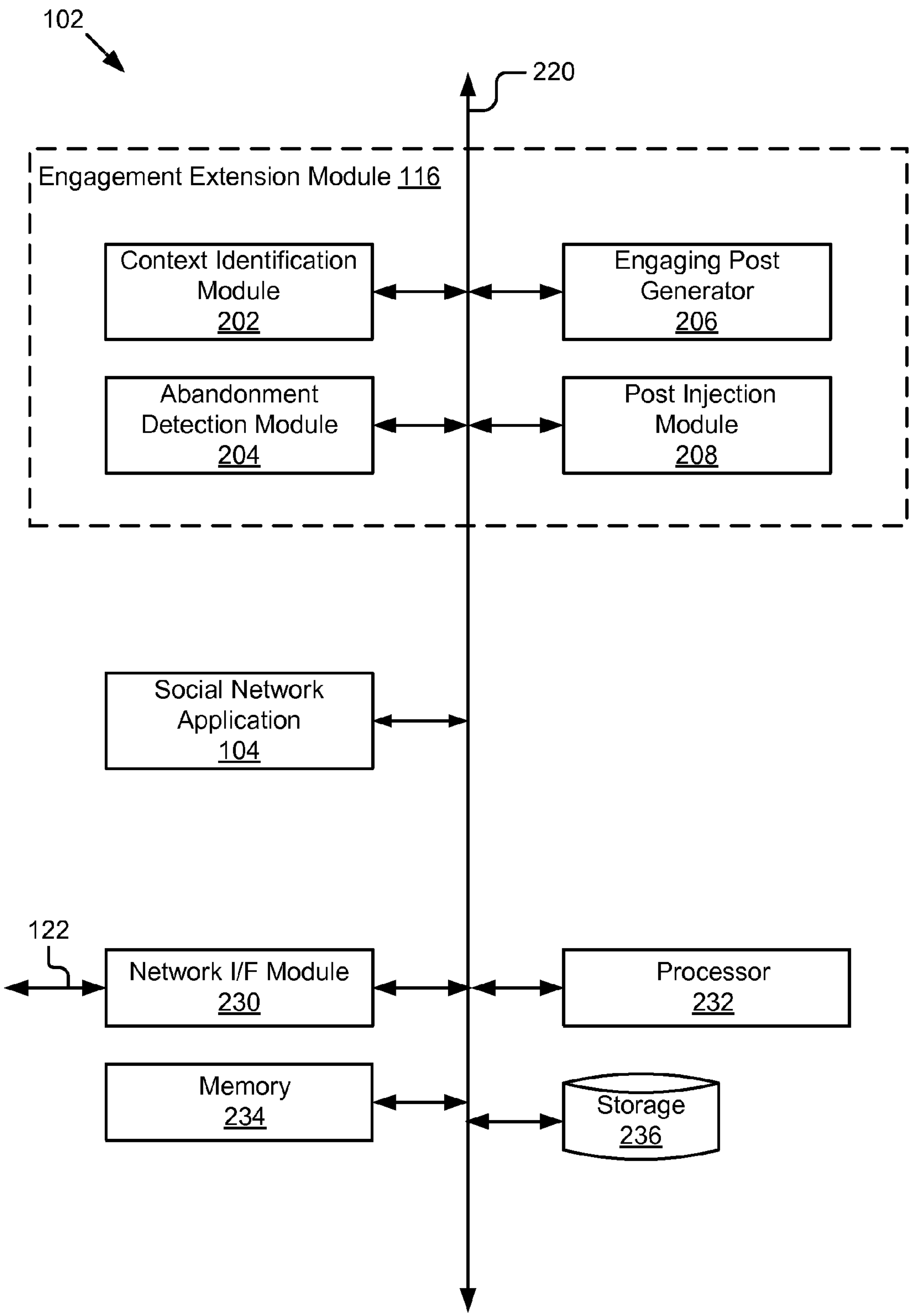
FIG. 2 is a block diagram illustrating a social network server including an engagement extension module according to some embodiments of the present disclosure.

FIG. 2 is a block diagram of one embodiment of the social network server 102. In this embodiment, the social network server 102 comprises: a network interface (I/F) module 230, a processor 232, a memory 234, storage 236, a social network application 104, and the extension engagement module 116.

The network interface module 230 is coupled to network 106 by signal line 122 and coupled to the bus 220. The network interface module 230 includes ports for wired connectivity such as but not limited to USB, SD, or CAT-5, etc. The network interface module 230 links the processor 232 to the network 106 that may in turn be coupled to other processing systems. The network interface module 230 provides other connections to the network 106 using standard network protocols such as TCP/IP, HTTP, HTTPS and SMTP. In other embodiments, the network interface module 230 includes a transceiver for sending and receiving signals using Wi-Fi, Bluetooth® or cellular communications for wireless communication.

The processor 232 comprises an arithmetic logic unit, a microprocessor, a general-purpose controller or some other processor array to perform computations and provide electronic display signals to a display device. The processor 232 is coupled to the bus 220 for communication with the other components. Processor 232 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 234 stores instructions and/or data that may be executed by processor 232. The memory 234 is coupled to the bus 220 for communication with the other components. The instructions and/or data may comprise code for performing any and/or all of the techniques described herein. The memory 234 may be a dynamic random access memory (DRAM) device, a static random access memory (SRAM) device, flash memory or some other memory device.

In one embodiment, the storage 236 stores data, information and instructions used by the social network server 102. Such stored information includes information about users, messages, posts, photos, and other information. The storage 236 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 236 is coupled by the bus 220 for communication with other components 116, 202, 204, 206, 208, 104, 230, 232 and 234 of the social network server 102.

The social network application 104 is software or routines operational on the social network sever 102 for implementing a social network structure as has been described above. The social network application 104 maintains records of a user's interests, friends, and provides an area in which to post messages, photos, videos and other content. The social network application 104 also processes interactions with the social network and other systems. Using those interactions and information, social network presents a stream of content that is tailored to the interests of the user. This stream of content can include messages, photos, videos web pages and other content from other users and friends of the user. The social network application 104 is coupled to the bus 220 for communication with the network interface module 230, the processor 232, the memory 234, the storage 236 and the extension engagement module 116.

Extension Engagement Module 116

Still referring to FIG. 2, the extension engagement module 116 is shown in greater detail. The extension engagement module 116 includes a context identification module 202, an abandonment detection module 204, an engaging post generator 206, and a post or message injection module 208. One function of the extension engagement module 116 is to determine when the user is likely to abandon or disengage from interacting with stream content, and inject into the content stream the new message or post that will keep the user engaged. These components 202, 204, 206 and 208 are coupled to the bus 220 for communication with each other and the other components 104, 230, 232, 234 and 236 of the social network server 102. The bus 220 can be any type of conventional communication bus. The operation of these modules 202, 204, 206 and 208 will be described in more detail below with reference to FIGS. 3-5B.

The context identification module 202 is software, code or routines for determining the user interaction with the social network application 104 and determining a context for the user. In particular, the context identification module 202 determines information about the particular context of the user with regard to stream content that is being presented to the user. The context identification module 202 interacts primarily with the social network application 104 to determine context; however, the context identification module 202 may also interact with the third party server 108, the SMS/MMS server 132, the micro blogging server 134 or the IM server 136. The context identification module 202 may also receive any information or signals that can be used to predict whether the user is about to abandon or disengage from interacting with the content stream. For example, the content identification module 202: 1) determines the state of whether messages in the content stream are unread or read, 2) determines the quality level of messages in the content stream, 3) receives global signals such as the number of posts that have been read by the user compared to the number of posts that are read before a user typically disengages, 4) receives local signals such as the number of posts that have been read by the user compared to the number of posts that this user reads before typically disengaging, 5) determines the duration of the current session of the user, 6) determines whether the page loading time is long and a prompt should be included before the pagination boundary, and 7) receives any other signals that the user is bored or going to abandon the content stream. In one embodiment, the context identification module 202 provides the information collected to the abandonment detection module 204. In some embodiments, the information collected by the context identification module 202 is also stored in the storage 236 for later use. The operation of the context identification module 202 is described in more detail below with reference to FIGS. 4 and 5.

The abandonment detection module 204 is software, code or routines for determining whether the user is likely to disengage or abandon from interaction with a content stream. The abandonment detection module 204 is coupled to receive input and signals from the context identification module 202. The operation of the abandonment detection module 204 will be described in more detail below with reference to FIGS. 5A and 5B. As noted above, the context identification module 202 provides a number signals to the abandonment detection module 204. The abandonment detection module 204 analyzes these signals to determine whether the user is likely to disengage or abandon interaction with a content stream. There are number of reasons why a user may disengage or abandon a content stream. The user may have no more posts or messages to read, the user may be bored with the content of the messages, or the browser the user may have high latency and the user may give up. The abandonment detection module 204 detects the situations and signals possible risks of user disengagement. For example, the abandonment detection module 204 determines the number of unread messages that the user has in their content stream. If the user has no unread messages or the number of unread messages small, the abandonment detection module 204 signals that there is a risk of the user disengaging. Similarly, the abandonment detection module 204 determines the quality of messages in the user stream. If the user has only a few high-quality messages left in their stream, the abandonment detection module 204 signals that there is a risk of the user disengaging. In another example, the abandonment detection module 204 measures the number of messages, posts or photos that the user has reviewed. The abandonment detection module 204 tracks a global number which indicates the average number of messages that users typically review before abandoning the content stream. The abandonment detection module 204 also tracks a local number which indicates the number of messages that this particular user typically reviews before abandoning the content stream. If the number of messages read by the user in his/her current context is greater than a global number or local number, the abandonment detection module 204 signals that there is a risk of the user disengaging. In yet another example, the abandonment detection module 204 maintains statistics on the duration of user sessions and the time at which users lose interest in the content stream. If the duration of the user's current session is close to point in time where users disengage, the abandonment detection module 204 signals that there is a risk of user disengaging. In another signal that is received by the abandonment detection module 204 is the time that is required for the content to load in the user's browser. If that time is greater than a predefined threshold, the abandonment detection module 204 may require the insertion of a post to extend engagement before the pagination boundary. It should be understood that the abandonment detection module 204 may also receive other signals that may indicate the likelihood of the user disengaging from reviewing the content stream. If any such signals are detected, the abandonment detection module 204 signals the risk of user disengagement. The abandonment detection module 204 is coupled to provide the risk of disengagement signals to engaging post generator 206 and the post or message injection module 208. In some embodiments, the abandonment detection module 204 also detects the boundary between messages in the content stream to identify the appropriate placement for the insertion of engaging messages.

The engaging post generator 206 is software, code or routines for generating an engaging post or message that can be inserted into the content stream of the user. The engaging post generator 206 generates messages with the purpose of the extending the user's engagement with the content stream. The engaging post generator 206 extends the users engagement with the content stream by generating messages that are entertaining, informative, interesting to the user, fun, require the user to take action, related to other people known to the user, etc. In a first embodiment, the engaging post generator 206 generates messages that asks the user to share something. For example, a message is posted to: 1) encourage users to create a specific piece of content and share it with a hashtag. Clicking the hashtag takes you to Search for the hashtag, with original message pinned to the top. These messages can be about the user's favorite drink, a hat, making a letter with your body, planking, owling, eating something, your favorite place. These messages can have holiday themes July 4th: with an American flag, October 31st: with your Halloween costume; 2) encourage the user to find and post a video; 3) encourage user to re-share chain-email information, 4) create new groups of friends using your existing social graph like taking your 7 relevance friends and creating a new group or circle; 5) share web comics with suggestions; 6) change to your profile or profile picture with suggestions; 7) check in from a specified location. In a second embodiment, the engaging post generator 206 generates messages that are whimsical and fun. For example, the message is: 1) a daily fortune; 2) a different cat video each time; 3) a Snapple fact; 4) a Flash game; 5) a Google doodles; etc. In third embodiment, the engaging post generator 206 generates messages that are informational. For example, the message includes information about: 1) trending hashtags; 2) social graph posts; 3) one year ago today; 4) webpage article of the day; 5) 6 of your friends uploaded new albums!; etc. In a fourth embodiment, the engaging post generator 206 generates messages that are promotional such as 1) offer for free items; 2) introduction to a new service; 3) discounts on goods or services; 4) complete survey for a gift; etc. In a fifth embodiment, the engaging post generator 206 generates a message that introduces new functionality of the social network application. In a sixth embodiment, the engaging post generator 206 generates an action the user can take on the social network including: adding people to their network, uploading photos, tagging photos, identifying the most popular post on the network or amount the user's friends, etc. In a seventh embodiment, the engaging post generator 206 generates a messages that includes a link or transitions to another web page, game or other system. In an eighth embodiment, the engaging post generator 206 identifies content and then includes it as part of a message. For example, the engaging post generator 206 creates engaging content by performing one or more from the group of: identifying engaging content; identifying content that has a score over a predefined threshold for likelihood of user engagement; identifying content that has frequent views; identifying content that has frequent shares, and identifying content that is spreading on a network virally. Then the engaging post generator 206 includes the engaging content or a portion of it in the message or references it in a post. Finally, a last embodiment is a combination of one or more of the above embodiments in which information from the social network application 104 is used to determine the type of message to create to engage the user. The operation of the engaging post generator 206 will be described in more detail below with reference to FIGS. 4, 5A and 5B. The engaging post generator 206 is coupled by the bus 220 for communication with the social network application 104, the abandonment detection module 204 and the post or message injection module 208.

The post or message injection module 208 is software, code or routines for inserting an engaging post or message into the content stream of the user. The injection module 208 is coupled to receive an engaging post from the engaging post generator 206 and a signal indicating a risk of user disengagement from the abandonment detection module 204. In response, the post or message injection module 208 inserts the engaging post from the engaging post generator 206 into the content of stream of the user. In one embodiment, the post or message injection module 208 determines the placement of the engaging post in the content stream. In other embodiments, the placement is specified by signals from the abandonment detection module 204. The post or message injection module 208 is coupled by the bus 220 for communication with the abandonment detection module 204, the engaging post generator 206 and the social network application 104.

One or more of the context identification module 202, the abandonment detection module 204, the engaging post generator 206, and the post or message injection module 208 are executable on the processor 232; store data that, when executed by the processor 232, causes the collectors/modules to perform the operations described herein; are instructions executable by the processor 232 to provide the functionality described herein; or are stored in the memory 234 of the social network server 102 and are accessible and executable by the processor 232.

Methods

Figure 3:
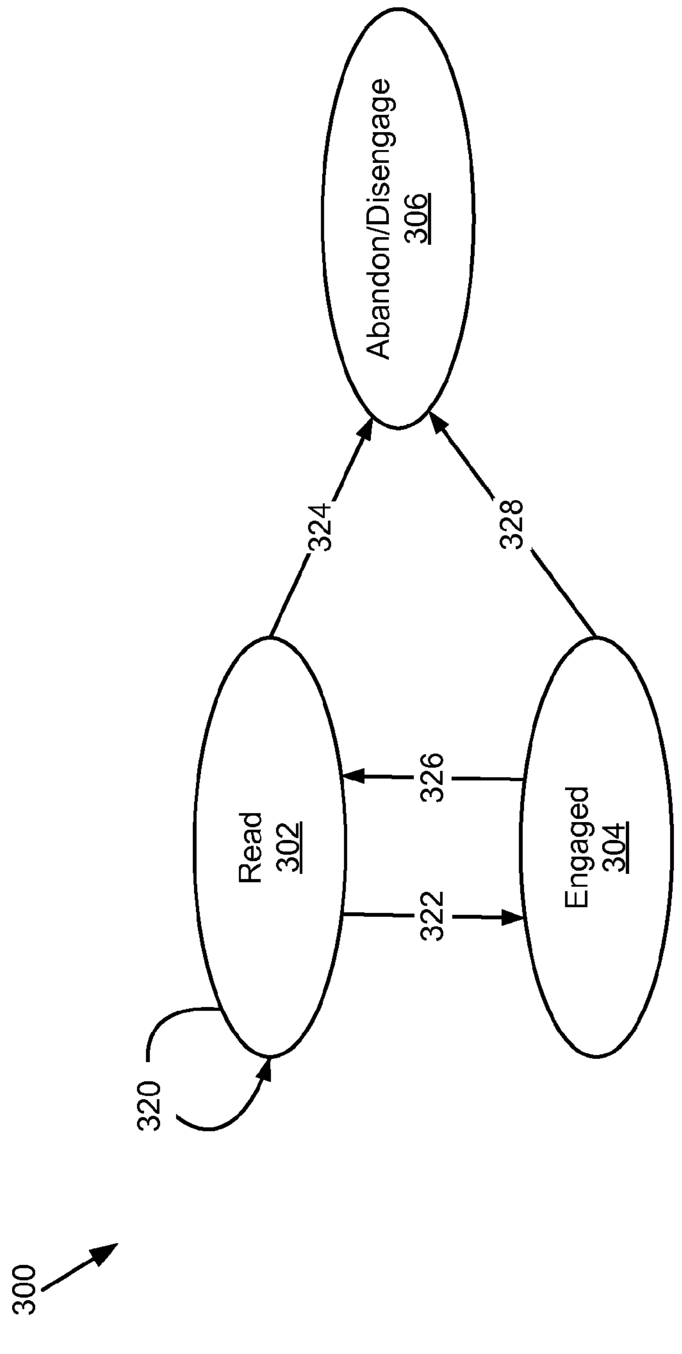
FIG. 3 is a state diagram showing engagement states of user with stream content according to some embodiments of the present disclosure.

Referring now to FIG. 3, a high-level state diagram of user states is shown. FIG. 3 shows a simplified state diagram of user states of engagement with stream content. In a first state or the read state 302, the user is reading content that is delivered via the stream. The user continues to be engaged and remains in the read state 302 as they traverse additional content provided by the stream shown in FIG. 3 by transition 320. If particular items that are presented in the stream interest the user they can transition 322 to a second state 304 (the engaged state 304). If the user becomes bored or leaves the social network, this is reflected by transition 324 from the read state 302 to a third state 306 (the abandoned or disengaged state 306). When in the engaged state 304, the user is interacting with the stream as evidenced by input signals that are received by the social network application 104. The user can transition 326 from the engaged state 304 back to the read state 302 such as by retrieving additional content and reading that content. The user may also transition 328 from the engaged state 304 to the abandoned/disengaged state 306 if the user is bored or exits the social network. The present disclosure is directed towards keeping the user in the read state 302 or the engaged state 304. In other words, the present disclosure is attempting to avoid transition 324 and 328. The present disclosure advantageously determines the behavior of the user when he/she is in the read state 302 or the engaged state 304. If the user performs behaviors likely to begin transition 324 or 328, new engaging messages are injected into the content stream to prevent such transitions 324 and 328.

Figure 4:
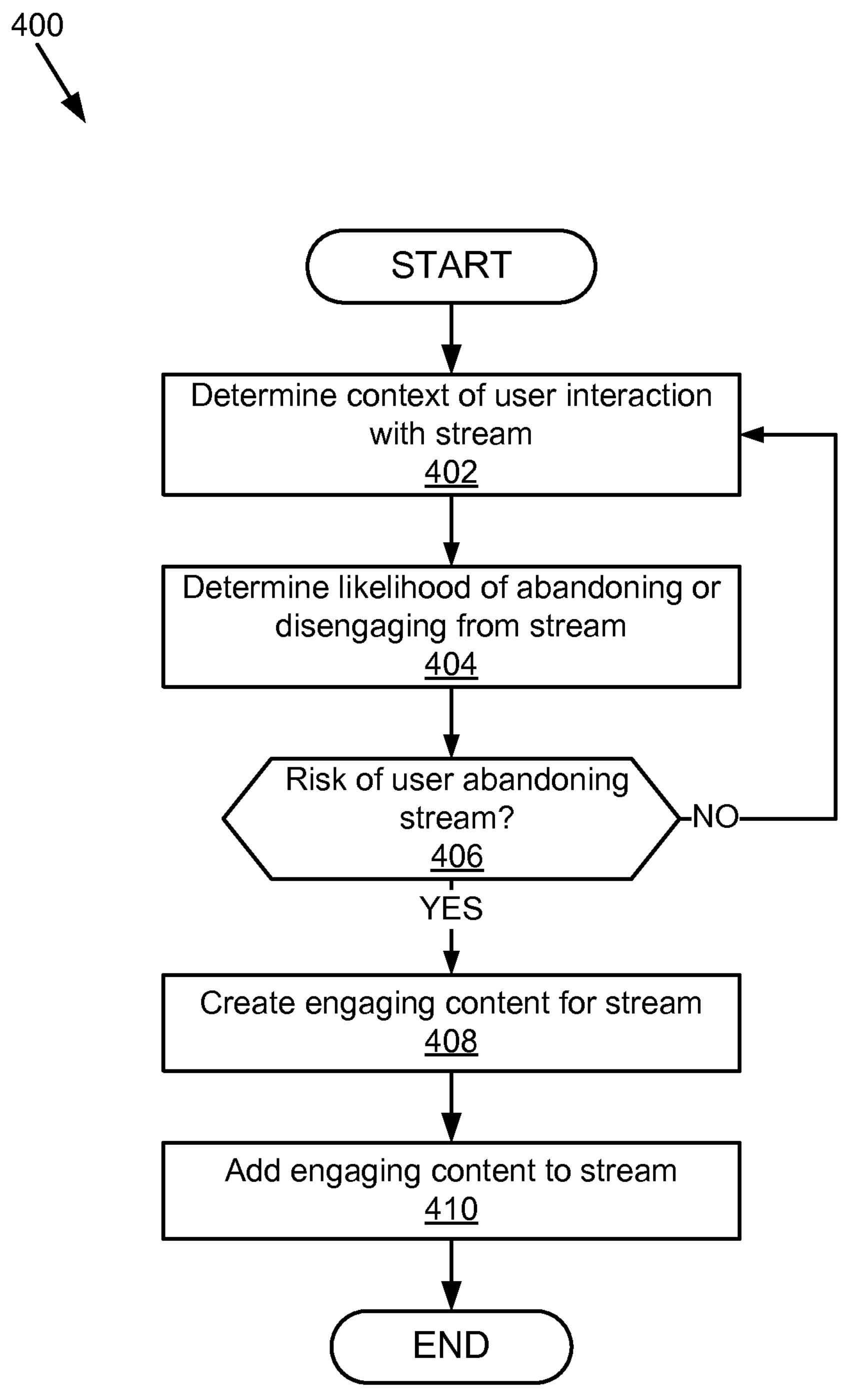
FIG. 4 is a flowchart of a method for detecting and extending user engagement with stream content according to some embodiments of the present disclosure.

Referring now to FIG. 4, an embodiment of a method 400 for detecting and extending user engagement with stream content is described. The method 400 begins by determining 402 the context of user interaction with the content stream. In one embodiment, this is performed by the context identification module 202. As described above, the method 400 may determine 1) determine the state of whether messages in the content stream are unread or read, 2) determine the quality level of messages in the content stream, 3) receive global signals such as the number of posts that have been read by the user compared to the number of posts that are read before a user typically disengages, 4) receive local signals such as the number of posts that have been read by the user compared to the number of posts that this user reads before typically disengaging, 5) determine the duration of the current session of the user, 6) determine whether the page loading time is long and a prompt should be included before the pagination boundary, and 7) receive any other signals from the social network application 104. Next, the method 400 determines 404 a likelihood of abandonment or disengagement from the content stream. In one embodiment, this is performed by the abandonment detection module 204. This step is described in more detail below with reference to FIGS. 5A and 5B. The method 400 then tests 406 whether there is a risk of the user abandoning the content stream. If not, the method returns to step 402 and continues to determine or receive the context of the user interaction with the stream. On the other hand, if there is a risk of the user abandoning the stream, the method 400 creates 408 new, engaging content for the stream. In one embodiment, creating 408 new, engaging content is performed by the engaging post generator 206 as has been described above. Finally, the method 400 completes by adding 410 the engaging content to the stream. In one embodiment, adding the engaging content to the stream is performed by the poster message injection module 208 as has been described above.

Figure 5A:
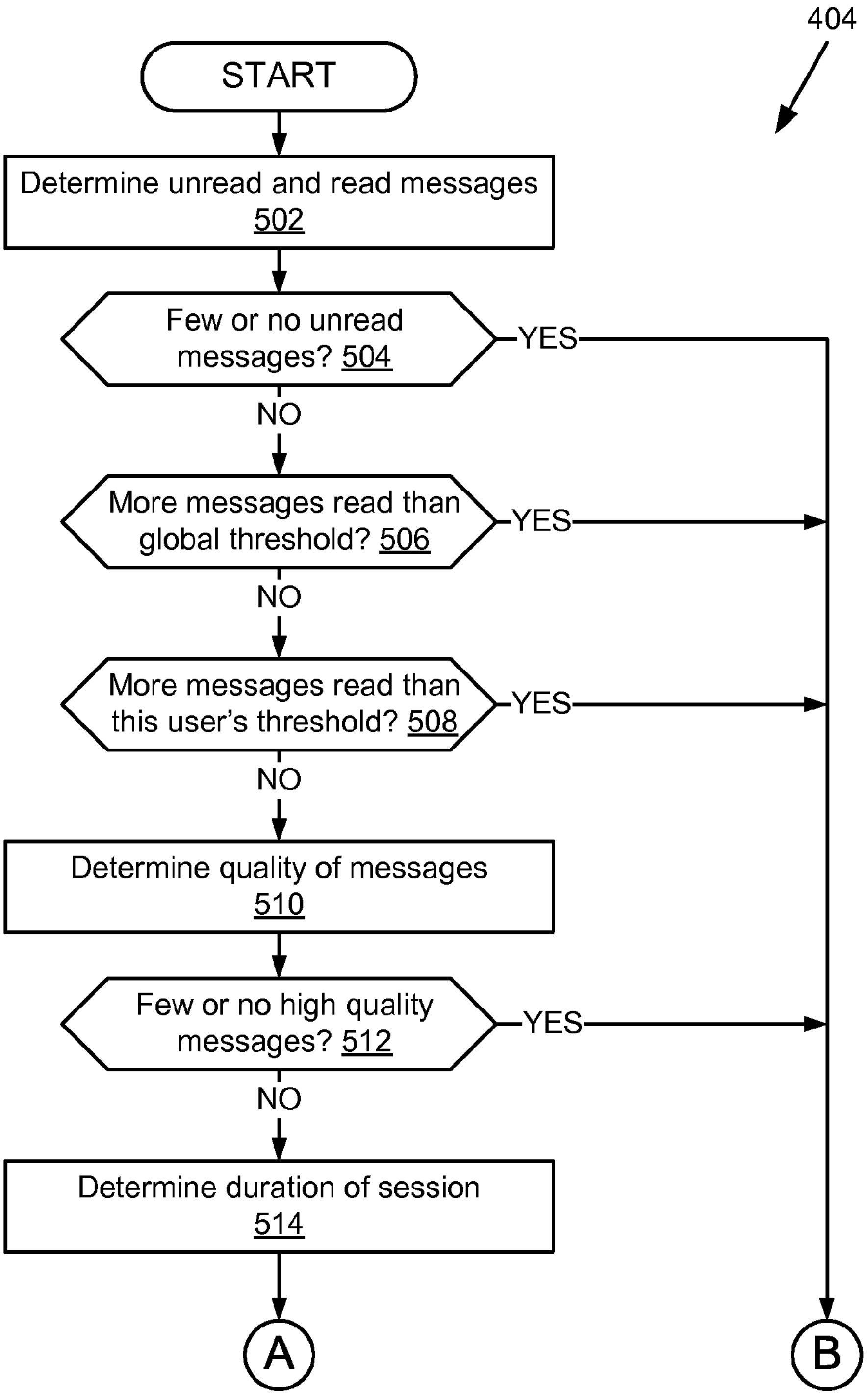
FIGS. 5A and 5B are a flowchart of a method for determining the likelihood of abandonment or disengagement from a stream according to some embodiments of the present disclosure.
Figure 5B:
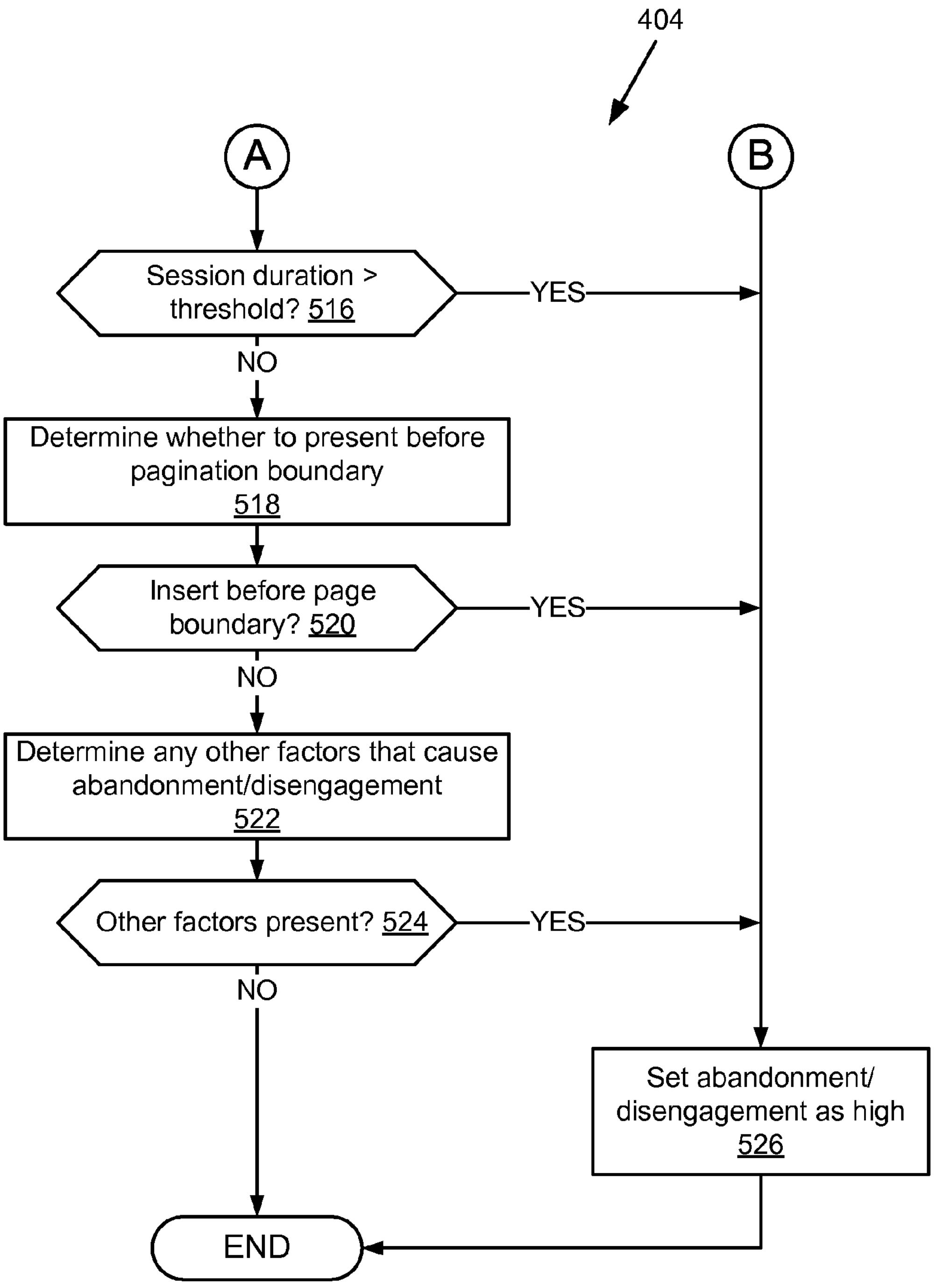

Referring now to FIGS. 5A and 5B, a method 404 for determining the likelihood of abandonment or disengagement from a stream according to some embodiments of the present disclosure is described. The method 404 begins by determining 502 whether there are any unread or read messages. In other words, the method 404 determines the messages in the stream for the user and determines how many messages or posts have a read status and how many messages or posts have an unread status. Next the method 404 determines 504 whether there are few or no unread messages for this user. If so, the method 404 proceeds to step 526 of FIG. 5B and signals that the likelihood of abandonment disengagement is high. If not, the method 404 continues to determine 506 whether the user has read more messages than a global threshold. As noted above, the risk of user disengagement increases after the user has read a predetermined number of messages or posts. This predetermined number is set as the global threshold. If the user has read more messages than the global threshold, the method continues at step 526 to FIG. 5B. On the other hand, if the user has not read more messages than the global threshold, the method proceeds to determine 508 whether the user has read more than a local threshold. In some embodiments, some users become bored more easily and thus have a local threshold that is different from the global threshold. The method 404 determines whether the user has read more messages than their own local threshold. If so, the method continues in step 526 of FIG. 5B. If not, the method continues to step 510.

Next, the method 404 determines 510 the quality of the messages in the stream of the user. For example, messages or posts that are frequently cited, re-shared, have global interestingness based on machine learning models, are fresh, have social affinity with posters or commenters, or are common among many users may be considered higher quality messages than others. Then the method 404 determines 512 whether there are a few or no high-quality messages in the stream of user. The lack of high-quality messages in the stream of the user may cause the user to become disengaged. Therefore, if few or no high-quality messages are found, the method 404 continues in step 526 of FIG. 5B. However, if there are a number of high-quality messages in the user's stream, the method 404 proceeds to determine 514 the duration of this session of interaction with the social network, and thus the stream. Referring now also to FIG. 5B, after step 514, the method 404 determines 516 whether the session duration is greater than a predefined threshold. In some embodiments, the abandonment detection module 204 includes session duration statistics that can are used to identify an average session duration time before users become disengaged. In one embodiment, the predefined threshold is set to be a minute or some other amount of time before the average session disengagement time. If the session duration is greater than the threshold, the method 404 proceeds to step 526. However if the session duration is not greater than the threshold, the method 404 continues to determine 518 whether and engaging message should be presented before the pagination boundary. If the engagement extension module 116 knows that the connection between the social network server 102 and the client device 110 A is slow and a significant amount of time is required for a page including the content stream to load, the present disclosure may require that engaging content be presented before the pagination boundary. The method determines 520 whether the engaging content should be inserted before the page boundary. If so, the method 404 continues to step 526 where the risk of abandonment or disengagement set of high and a signal indicating that the engaging message should be inserted before the page boundary is included. If the engaging content does not need to be inserted before the page boundary, the method 404 considers 522 any other factors that may cause abandonment or disengagement. Then the method 404 determines 524 whether any of the other factors are present. If not, the method 404 is complete and ends. On the other hand, if other factors are present, the method continues in step 526. In step 526, the method 404 sends a signal or sets in abandonment or disengagement level of high. In one embodiment, the abandonment detection module 204 signals the engaging post generator 206 and the post injection module 208 as to the risk level. After the engaging post generator 206 and the post injection module 208 have been signaled the method 404 is complete and ends.

In some embodiments, the methods and processes of the present disclosure are performed on line and in real time by the system 100. In other embodiments, portions of the methods and process of the present disclosure may be performed offline or in advance of other portions of the process. For example, the boundary between read and unread messages may be precomputed and engaging content inserted there without determining user activity on the social network or the quality level and placement of engaging messages may be precomputed.

User Interfaces

Figure 6:
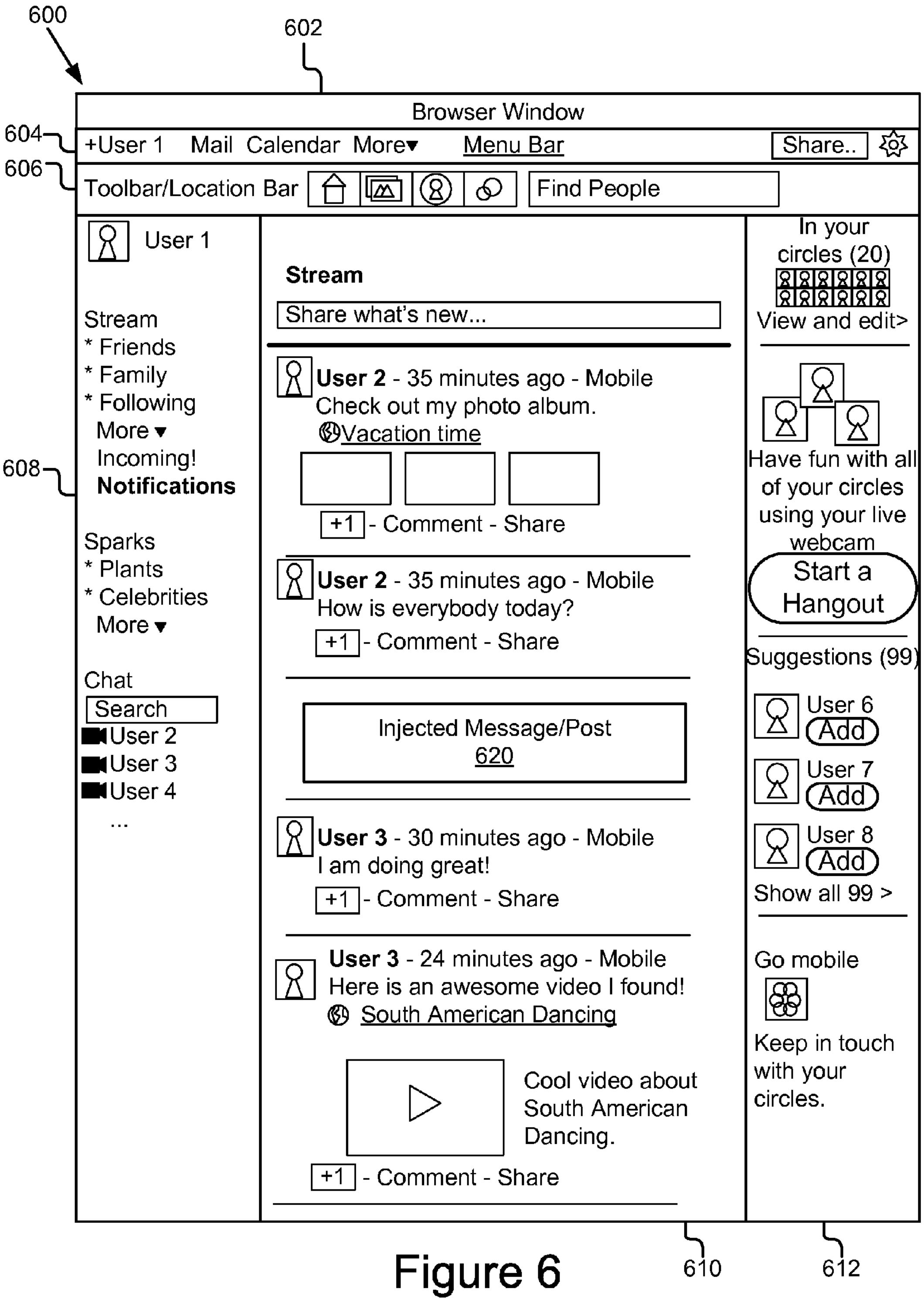
FIG. 6 is a graphic representation of a first embodiment of a user interface for presenting a content stream including a message injected to extend engagement according to the present disclosure.

Referring now to FIG. 6, a first embodiment of a user interface 600 for presenting a content stream including a message injected to extend engagement is shown. The user interface 600 includes a browser window 602 having a number of components including a menu bar 604, a tool bar 606, a left sidebar 608, a display area 610 and a right side bar 612. Although not shown, the user interface 700 may include various other components of a conventional browser window such as an address bar, multiple tabs, etc. The menu bar 604 provides an area for user identification and menus for accessing other systems. The tool bar 606 provides icon for accessing different functions of a social network including a search box for finding other users. The left sidebar 608 provides a region for displaying a plurality of hypertext links to other streams, content feeds, notifications, chats and information about other user's on-line presence. The right side bar 612 includes other information about social networks such as groupings, video chat, and suggestions for other actions on the social network. The display area 610 of the user interface 600 includes a stream of several messages or posts. The messages are posts each include identification of the author of the post, the time when was posted and the actual post or a digest of the post. Posts or messages can also include photos, videos or other files. Each post includes links to allow simple access for endorsement, commenting and sharing. The user interface 600 shows one example message 620 that has been injected into the stream of the user.

Figure 7:
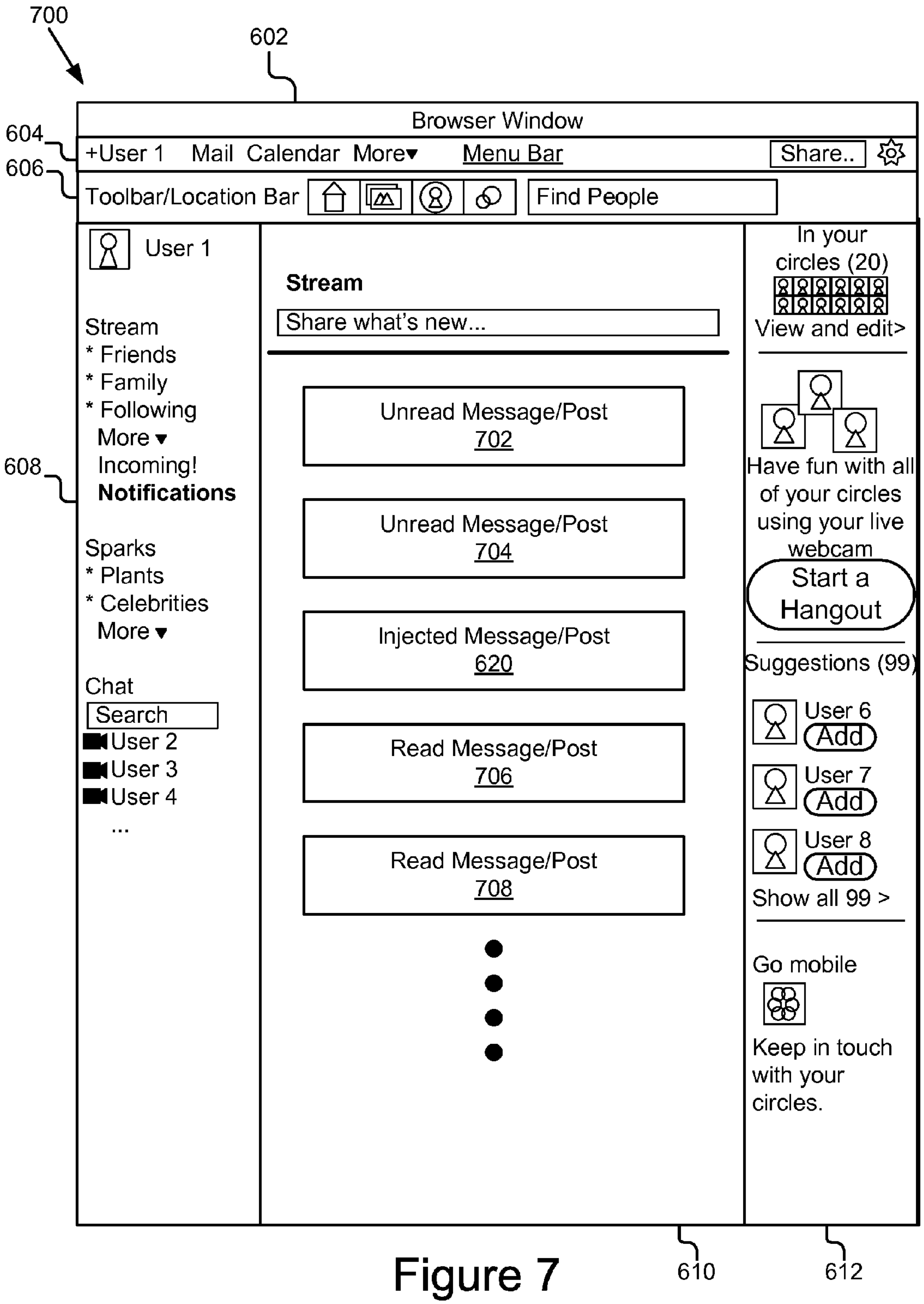
FIG. 7 is a graphic representation of a second embodiment of a user interface for presenting a content stream including a message injected to extend engagement according to the present disclosure.

Referring now to FIG. 7, a second embodiment of a user interface 700 for presenting a content stream including a message injected to extend engagement is shown. Like the prior user interface 600, the second embodiment of the user interface 700 is a browser window 602 including the menu bar 604, the tool bar 606, the left sidebar 608, the display area 610 and the right side bar 612. In this embodiment of the user interface 700, the messages or posts are shown in simplified block diagram form as compared with the posts of FIG. 6. The stream shown in FIG. 7 illustrates a plurality of messages 702, 704, 620, 706 and 708 in the user's stream. The engagement extension module 116 has identified that there are only two unread messages 702, 704 in the stream for this user. Thus the engagement extension module 116 adds injected message/post 620 into the user stream. The engagement extension module 116 advantageously places the injected message/post 620 after the last unread message and before the first read message. Thus it will be apparent how the present invention attempts to extend the engagement of the user by adding engaging content at the proper position in the user stream.

Figure 8:
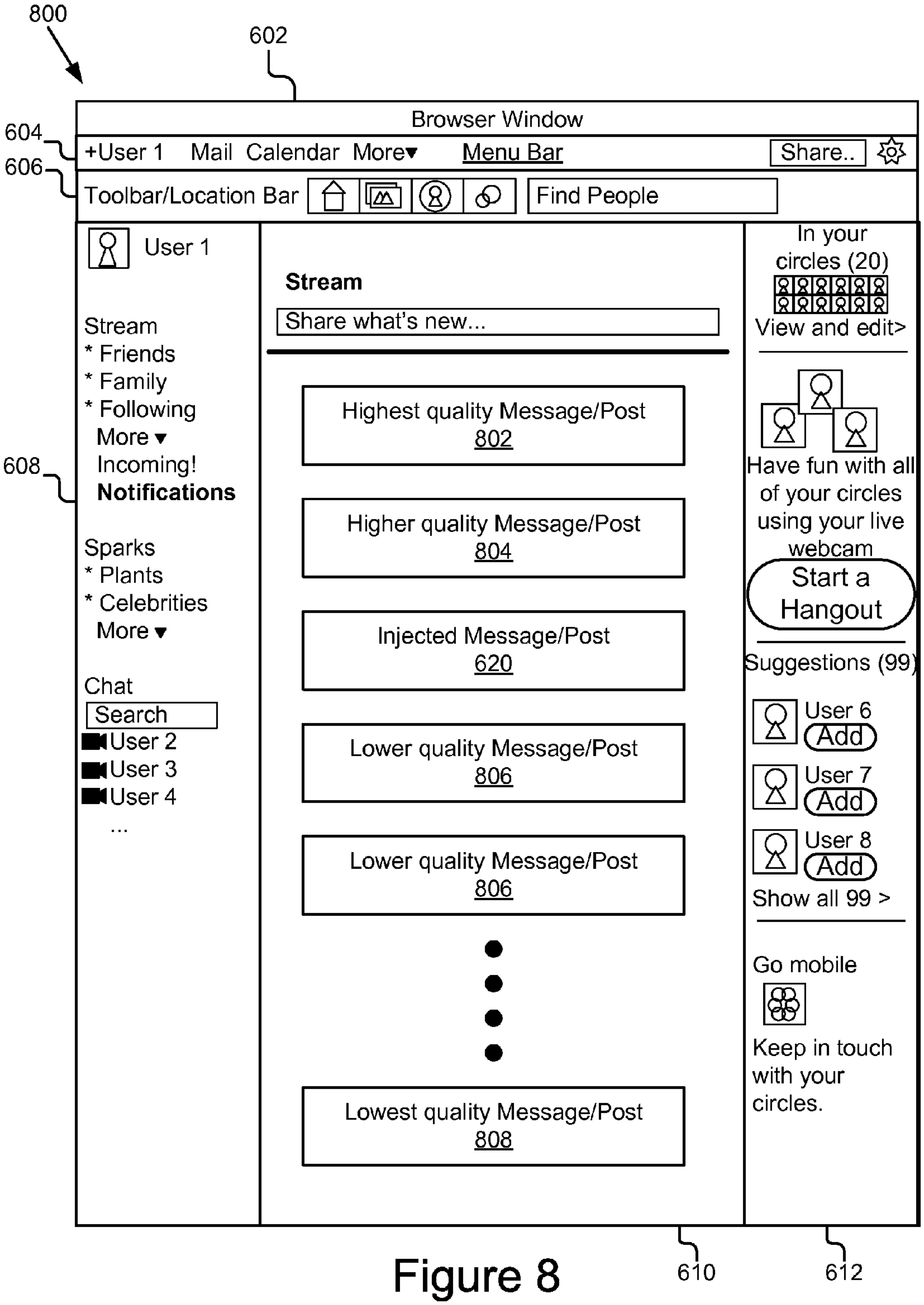
FIG. 8 is a graphic representation of a third embodiment of a user interface for presenting a content stream including a message injected to extend engagement according to the present disclosure.

Referring now to FIG. 8, a third embodiment of a user interface 800 for presenting a content stream including a message injected to extend engagement is shown. Like the prior user interface 600, the third embodiment of the user interface 800 is a browser window 602 including the menu bar 604, the tool bar 606, the left sidebar 608, the display area 610 and the right side bar 612. In this embodiment of the user interface 800, the messages or posts are again shown in simplified block diagram form as compared with the posts of FIG. 6. The stream shown in FIG. 8 illustrates a plurality of messages 802, 804, 620, 806 and 808 in the user's stream. In this embodiment, the messages are presented in order from top to bottom from the highest quality message 802 to the lowest quality message 808. The engagement extension module 116 has identified a placement point between higher quality message 804 and lower quality message 806. The engagement extension module 116 inserts the injected message 620 into the stream of the user at the placement point. This example illustrates how the engagement extension module 116 inserts the injected message 620 at a point where it is most likely to cause the user to read the engaging post and continue their interaction with the stream.

Figure 9:
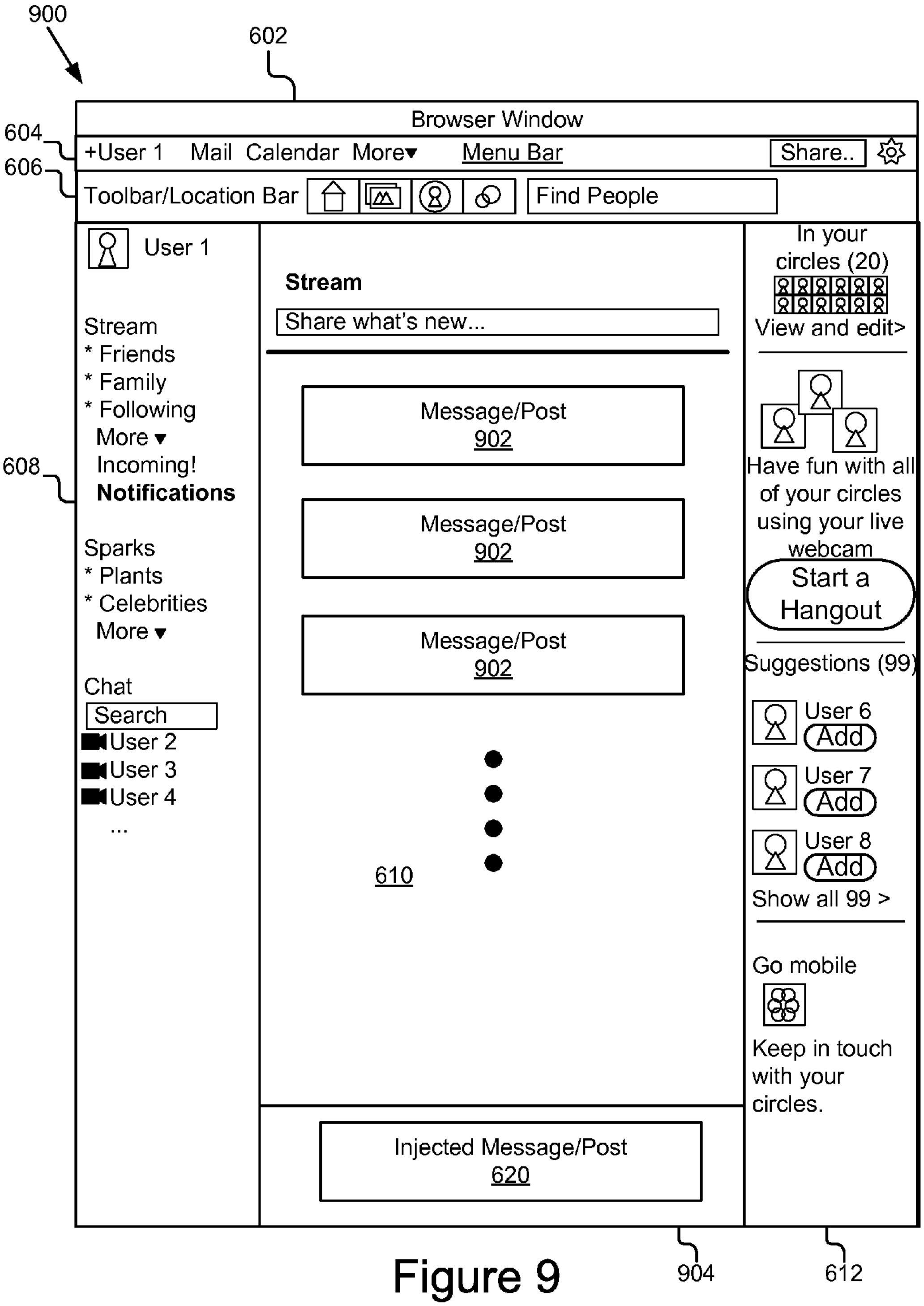
FIG. 9 is a graphic representation of a fourth embodiment of a user interface for presenting a content stream including a message injected to extend engagement according to the present disclosure.

Referring now to FIG. 9, a fourth embodiment of a user interface 900 for presenting a content stream including a message injected to extend engagement is shown. Like the prior user interface 600, the fourth embodiment of the user interface 900 is a browser window 602 including the menu bar 604, the tool bar 606, the left sidebar 608, the display area 610 and the right side bar 612. In this embodiment of the user interface 900, the messages or posts are again shown in simplified block diagram form as compared with the posts of FIG. 6. The stream shown in FIG. 9 illustrates a plurality of messages 902 in the user's stream. In this embodiment, the messages are presented in a conventional manner by the social network software application 104. The messages may be ordered by quality or read or unread status. In this example, the engagement extension module 116 has determined that the user has a poor connection and the browser window loads very slowly. Thus, the engagement extension module 116 creates a non-scrolling portion 904 at the bottom of the display area 610. Within that non-scrolling portion 904, the engagement extension module 116 presents the injected message 620. Thus, if the user is considering disengaging because of the time required to load the page, the injected method 620 is nonetheless presented in an attempt to extend the user's interaction with the stream. In some embodiments, the non-scrolling portion 904 and the injected message 620 are set as the first part of the page to be loaded by the browser.

Systems and methods for detecting and extending user engagement with stream content have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of a social network server; however, the disclosed technologies apply to other data sources and other data types (e.g., collections of other resources such as images, audio, web pages) that detect and extend user engagement with content.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method for detecting and extending user engagement with a stream of content, the method comprising:

determining a context of user interaction with the stream of content from a social network;

determining a likelihood of abandonment from the user interaction with the stream of content, the likelihood of abandonment indicating a likelihood that a user may disengage from interacting with the stream of content by ending a user session with the social network, the user session having been previously initiated;

creating engaging content; and providing for display the engaging content to the user if the likelihood of abandonment satisfies a threshold.

2. The method of claim 1, wherein determining the context of user interaction includes receiving a user interaction signal from a social network.

3. The method of claim 2, wherein the user interaction signal from the social network includes one or more from the group of: whether messages in the stream of content are read, whether messages in the stream of content are unread, a quality level of a message in the stream of content, a number of messages read, a number of messages read by a typical user, a number of messages read by a particular user, a duration of a session, and a loading time of a web page.

4. The method of claim 1, wherein determining the likelihood of abandonment includes:

determining a number of unread messages, and sending a risk of abandonment signal if the number of unread messages is a few or none.

5. The method of claim 1, wherein determining the likelihood of abandonment includes:

determining a number of read messages, and sending a risk of abandonment signal if the number of read messages is greater than a global threshold.

6. The method of claim 1, wherein determining the likelihood of abandonment includes:

determining a number of read messages, and sending a risk of abandonment signal if the number of read messages is greater than a local threshold.

7. The method of claim 1, wherein determining the likelihood of abandonment includes:

determining a number of high quality messages, and sending a risk of abandonment signal if the number of high quality messages is a few or none.

8. The method of claim 1, wherein determining the likelihood of abandonment includes:

determining a duration of a user session, and sending a risk of abandonment signal if the duration of the user session is greater than a predetermined amount of time.

9. The method of claim 1, wherein determining the likelihood of abandonment includes:

determining whether to present an engaging message before a pagination boundary, and sending a risk of abandonment signal if the engaging message should be presented before a pagination boundary.

10. The method of claim 1, wherein the engaging content is one from the group of: a request to share information, a message that is fun or whimsical, a message that is informational, a message that is promotional, a message that introduces new functionality of a social network, an action a user can take on the social network, a message that transitions to another web page, game or other system.

11. The method of claim 1, wherein creating engaging content includes one from the group of: identifying engaging content; identifying content that has a score over a predefined threshold for likelihood of user engagement; identifying content that has frequent views; identifying content that has frequent shares, and identifying content that is spreading on a network virally.

12. The method of claim 1, wherein providing for display the engaging content includes adding the engaging content to the stream of content.

13. A computer program product comprising a non-transitory computer usable medium including a computer readable program, wherein the computer readable program when executed on a computer causes the computer to:

determine a context of user interaction with the stream of content from a social network;

determine a likelihood of abandonment from the user interaction with the stream of content, the likelihood of abandonment indicating a likelihood that a user may disengage from interacting with the stream of content by ending a user session with the social network, the user session having been previously initiated;

create engaging content; and provide for display the engaging content to the user if the likelihood of abandonment satisfies a threshold;

determine a duration of a user session, and send a risk of abandonment signal if the duration of the user session is greater than a predetermined amount of time.

14. The computer program product of claim 13, wherein the determination of the context of user interaction includes receiving a user interaction signal from a social network.

15. The computer program product of claim 14, wherein the user interaction signal from the social network includes one or more from the group of: whether messages in the stream of content are read, whether messages in the stream of content are unread, a quality level of a message in the stream of content, a number of messages read, a number of messages read by a typical user, a number of messages read by a particular user, a duration of a session, and a loading time of a web page.

16. The computer program product of claim 13, wherein the computer readable program when executed on the computer causes the computer to also:

determine a number of unread messages, and send a risk of abandonment signal if the number of unread messages is a few or none.

17. The computer program product of claim 13, wherein the computer readable program when executed on the computer causes the computer to also:

determine a number of read messages, and send a risk of abandonment signal if the number of read messages is greater than a global threshold.

18. The computer program product of claim 13, wherein the computer readable program when executed on the computer causes the computer to also:

determine a number of read messages, and send a risk of abandonment signal if the number of read messages is greater than a local threshold.

19. The computer program product of claim 13, wherein the computer readable program when executed on the computer causes the computer to also:

determine a number of high quality messages, and send a risk of abandonment signal if the number of high quality messages is a few or none.

20. The computer program product of claim 13, wherein the computer readable program when executed on the computer causes the computer to also:

determine a duration of a user session, and send a risk of abandonment signal if the duration of the user session is greater than a predetermined amount of time.

21. The computer program product of claim 13, wherein the computer readable program when executed on the computer causes the computer to also:

determine whether to present an engaging message before a pagination boundary, and send a risk of abandonment signal if the engaging message should be presented before a pagination boundary.

22. The computer program product of claim 13, wherein the engaging content is one from the group of: a request to share information, a message that is fun or whimsical, a message that is informational, a message that is promotional, a message that introduces new functionality of a social network, an action a user can take on the social network, a message that transitions to another web page, game or other system.

23. The computer program product of claim 13, the creation of engaging content includes one from the group of: identifying engaging content; identifying content that has a score over a predefined threshold for likelihood of user engagement; identifying content that has frequent views; identifying content that has frequent shares, and identifying content that is spreading on a network virally.

24. The computer program product of claim 13, wherein provision for display includes adding the engaging content to the stream of content.

25. A system for detecting and extending user engagement with stream content comprising:

a processor; and a memory storing instructions executable by the processor, the memory comprising:

a context identification module having an input and an output, the context identification module determining interaction of a user with a stream of content from a social network and generating an interaction signal for a context of the user, the input of the context identification module coupled to receive signals from a social network;

an abandonment detection module having an input and an output, the abandonment detection module analyzing the interaction signal to determine whether there is a likelihood that the user may abandon the stream of content by ending a user session with the social network, the user session having been previously established, the likelihood of abandonment being determined based on the user interaction with the stream of content, the input of the abandonment detection module coupled to the output of the context identification module;

an engaging post generator having an input and an output, the engaging post generator producing an engaging message to the keep the user engaged, the input of the engaging post generator coupled to the output of the abandonment detection module to receive a the risk signal indicating that the likelihood of abandonment satisfies a threshold; and an injection module having an input and an output, the injection module for providing for display the engaging message in response to the risk signal indicating that the user may abandon the stream of content from the abandonment detection module, the input of the injection module coupled to the output of the abandonment detection module to receive the risk signal and to the output of the engaging post generator to receive the engaging message.

26. The system of claim 25 the interaction signal from the social network includes one or more from the group of: a signal whether messages in the stream of content are read, a signal whether messages in the stream of content are unread, a signal indicating a quality level of a message in the stream of content, a signal representing a number of messages read, a signal representing a number of messages read by a typical user, a signal representing a number of messages read by a particular user, a signal representing a duration of a session, and a signal representing a loading time of a web page.

27. The system of claim 25, wherein the abandonment detection module determines the likelihood of abandonment by determining a number of unread messages, and sends the risk signal if the number of unread messages is a few or none.

28. The system of claim 25, wherein the abandonment detection module determines the likelihood of abandonment by determining a number of read messages and sends the risk signal if the number of read messages is greater than a global threshold.

29. The system of claim 25, wherein the abandonment detection module determines the likelihood of abandonment by determining a number of read messages and sends the risk signal if the number of read messages is greater than a local threshold.

30. The system of claim 25, wherein the abandonment detection module determines the likelihood of abandonment by determining a number of high quality messages and sends the risk signal if the number of high quality messages is a few or none.

31. The system of claim 25, wherein the abandonment detection module determines the likelihood of abandonment by determining a duration of a user session and sends the risk signal if the duration of the user session is greater than a predetermined amount of time.

32. The system of claim 25, wherein the abandonment detection module determines the likelihood of abandonment by determining whether to present an engaging message before a pagination boundary and sends the risk signal if the engaging message should be presented before a pagination boundary.

33. The system of claim 25, wherein the engaging content is one from the group of: a request to share information, a message that is fun or whimsical, a message that is informational, a message that is promotional, a message that introduces new functionality of a social network, an action a user can take on the social network, a message that transitions to another web page, game or other system.

34. The system of claim 25, wherein the engaging post generator producing the engaging message by performing one from the group of: identifying engaging content; identifying content that has a score over a predefined threshold for likelihood of user engagement; identifying content that has frequent views; identifying content that has frequent shares, and identifying content that is spreading on a network virally.

35. The system of claim 25, wherein the injection module adds the engaging content to the stream of content.

* * * * *